Sept. 5, 1967 J. E. HOLT 3,340,235
FORMED NYLON AND METHOD
Filed Feb. 21, 1966 2 Sheets-Sheet 1
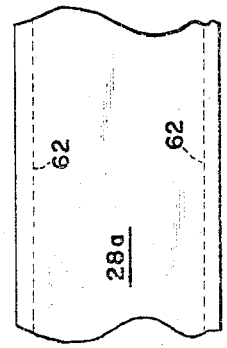
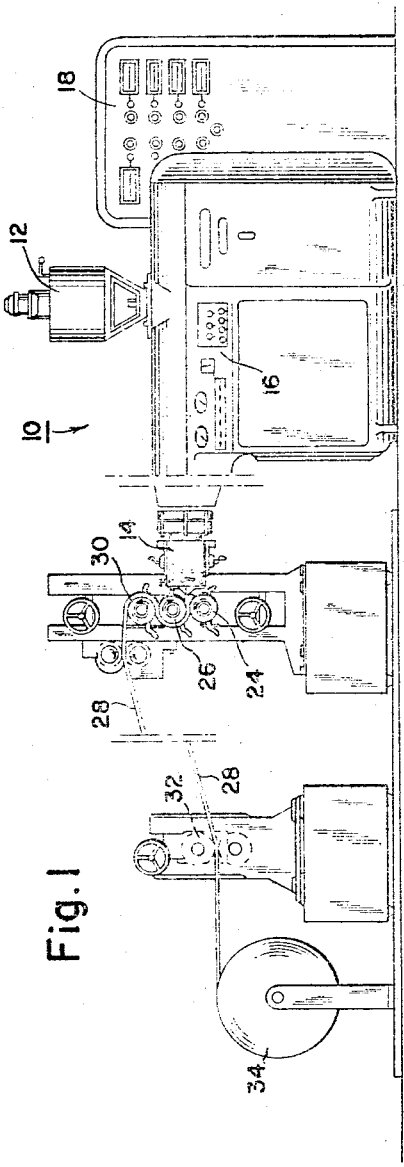
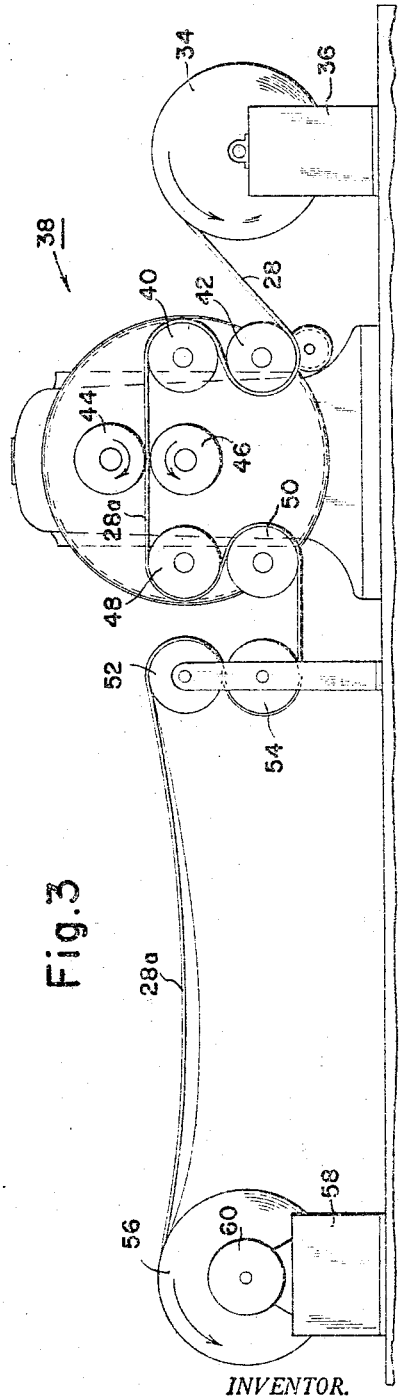
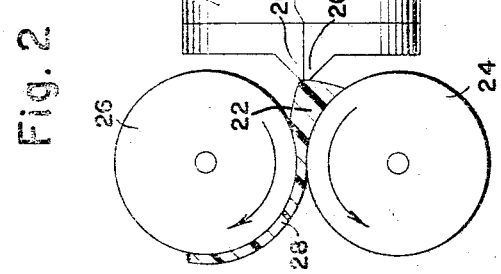
INVENTOR.
John E. Holt
BY
Curtis, Morris, & Safford
ATTORNEYS Sept. 5, 1967 J. E. HOLT 3,340,235
FORMED NYLON AND METHOD
Filed Feb. 21, 1966 2 Sheets-Sheet 2

INVENTOR.
JOHN E. HOLT

BY
Curtis, Morris & Safford
ATTORNEYS

United States Patent Office 3,340,235
Patented Sept. 5, 1967

3,340,235
FORMED NYLON AND METHOD
John E. Holt, Hampton, Conn. 06247
Filed Feb. 21, 1966, Ser. No. 534,276
5 Claims. (Cl. 260—78)

This application is a continuation-in-part of my copending application Ser. No. 405,329, filed Oct. 13, 1964 (now abandoned), which was a continuation-in-part of application Ser. No. 155,885, filed Nov. 22, 1961 (now abandoned), which was a continuation-in-part of application Ser. No. 153, filed Jan. 4, 1960 (now abandoned). This invention relates to improvements in plastic materials of the type known as nylon, i.e., polyamide resins, and to methods of producing such improved plastic materials. More in particular, this invention relates to methods for making thin nylon plastic sheeting having special physical characteristics, e.g., improved linearity in the stress-strain curve, and reduced deformability, very high tensile strength, low elongation under load, and to nylon plastic articles having such special characteristics.

Nylon plastic has, of course, found widespread use in a variety of applications where its inherent properties provide significant advantages. For example, nylon has been used in combination with other materials to improve the overall strength or durability of a product, such as the use of nylon cord in rubber tires. It has also been proposed to combine nylon plastic sheeting, i.e., relatively wide strips of thin nylon, with rubber or other materials to form laminated power transmission belts, conveyor belts and the like. However, it has been found that conventional nylon sheeting is not well suited for such applications, especially because it does not have sufficient tensile strength.

Nylon plastic strip or sheeting normally is cast by an extrusion process wherein the basic plastic chemicals are placed, in powder form, in an extruding machine adapted to heat the powder to a molten condition and to force the molten plastic in a more or less viscous state out through the wide lips of a die. The resulting nylon sheeting typically will have a tensile strength at room temperature of up to 12,000 p.s.i. depending upon the commercial formula used. Although this is high relative to the strengths of a number of other materials, it is too low for certain special applications such as discussed above.

It is known that the tensile strength of nylon filament and the like can be increased by applying sufficient tension to stretch the filament longitudinally, i.e., by pulling the filament from a supply roll the rotation of which is suitably restrained. By using a very large pulling force in combination with a substantial braking force on the supply roll, it is evident that the filament may be physically stretched in a longitudinal direction. This tension-stretching action apparently "orients" the internal structure of the nylon in a manner which increases the tensile strength in the final product.

Although this tension-stretching method may be feasible for nylon filaments or even small-width strips, it is not practical when applied to relatively wide nylon sheeting. This is because the equipment required would necessarily be very large and expensive and, in addition, the width as well as the thickness of the nylon sheeting would be decreased in proportion to its elongation. However, these and related problems have been solved by the present invention which provides relatively inexpensive methods for increasing the tensile strength of nylon sheeting, and without producing any effective decrease in its width.

Accordingly, it is an object of this invention to provide nylon having superior physical characteristics. It is a further object of this invention to provide improved methods for producing nylon, particularly in the form of thin sheeting and the like. It is a still further object of this invention to produce nylon in the form of thin sheeting or relatively wide strips and having very high tensile strength. A further object is to provide nylon strips and sheets having a low factor of elongation under load. A further object is to provide nylon sheeting which may be subjected to substantial tension loads without objectionable residual elongation after the load has been removed. A still further object is to provide nylon whose stress-strain characteristics are substantially linear. Other objects, aspects and advantages of the invention will be in part pointed out in, and in part apparent from, the following description of a preferred embodiment of the invention, considered together with the accompanying drawings in which:

FIGURE 1 shows an extruding machine adapted to produce thin nylon sheet or sheeting;

FIGURE 2 is an enlarged detail showing the manner in which the molten nylon is chilled by and is fed through the forming rolls;

FIGURE 3 shows a roller arrangement through which the extruded sheet or sheeting is passed to improve its mechanical properties;

FIGURE 4 shows a portion of the completed nylon sheet or sheeting;

Figure 5:
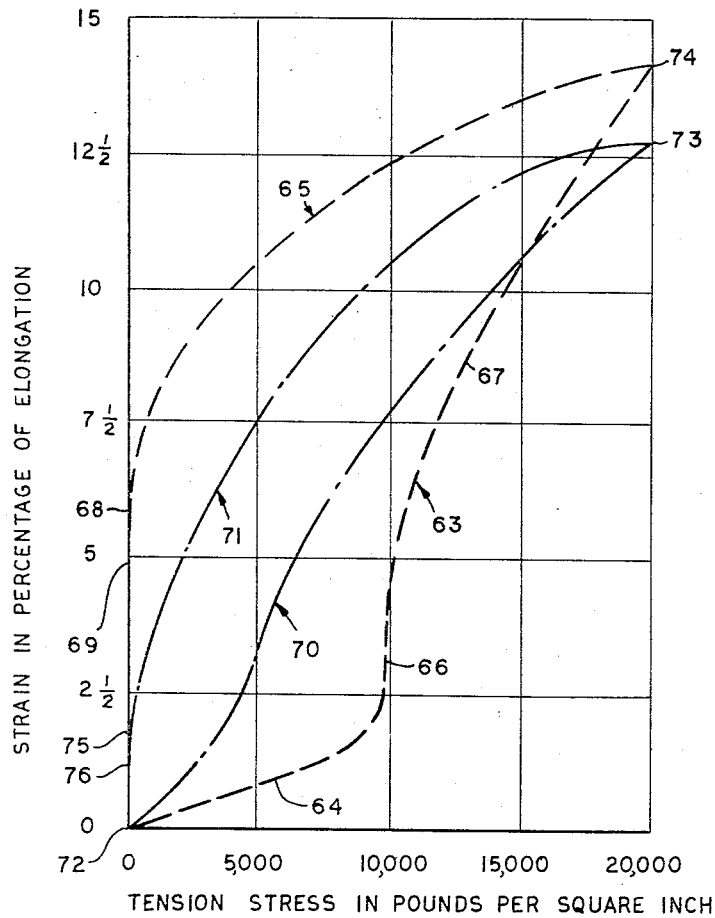
FIGURE 5 is a chart showing stress-strain curves of nylon sheet or sheeting produced in accordance with the present invention; and, FIGURE 6 is a view similar to FIGURE 3, showing the roller arrangement by which the nylon sheet or sheeting is subjected to the final step in the process of manufacturing.

Referring now to FIGURE 1, there is shown a conventional extruding machine 10 having a hopper 12 to receive the nylon plastic powder. Within this machine is a feedscrew (not shown) arranged to push the powder forward, i.e., to the left, through a heating region where the powder is melted, and thence to a sheet-forming die 14. Various operating controls 16 and 18 are provided in the usual manner for the extruding machine.

As shown in FIGURE 2, the die 14 includes top and bottom lips 20 having a substantial lateral width, e.g., 12 inches or more, and through which the nylon is forced into a tacky viscous puddle 22 lying on the upper surface of a metal forming roll 24. The nylon is drawn from puddle 22 between roll 24 and a second forming roll 26. The vertical spacing between these two rolls determine the thickness of the sheeting 28. From roll 26, the nylon sheeting is fed around a third forming roll 30, over to a pair of tension rolls 32, e.g., formed of rubber or the like, and then is wound onto a spool 34.

The nylon puddle 22 may be formed by initially operating the machine 10 at an output rate greater than the draw rate of rolls 24 and 26 and then, after the puddle has grown to a sufficient size, reducing the output of the machine to the normal draw rate of the rolls. The die lips 20 should be positioned very close to the nip of rolls 24 and 26, i.e., as close as possible without causing interference between the die 14 and the rolls. Once the puddle has been formed, the machine will continually feed nylon into one edge of the puddle, and the rolls 24 and 26 will draw nylon from the puddle and form it into sheeting of the desired thickness, e.g., 0.1″ or so. This arrangement is particularly advantageous because the cast nylon sheeting will be of a very consistent thickness as compared to conventional arrangements wherein the sheeting is fed directly from the die lips to rolls which are spaced apart a distance substantially greater than the sheeting thickness.

The cast nylon sheeting 28, as produced by the extruding machine 10, has the usual mechanical properties of ordinary nylons, which properties of course vary somewhat with the different commercial nylon formulas. In particular, the nylon sheeting may have a tensile strength at room temperature of up to 12,000 p.s.i., which as noted above is insufficient for certain important sheeting applications. However, in accordance with the present invention, this nylon sheeting is further processed by orienting it to substantially increase its tensile strength and improve other of its mechanical properties.

For this purpose, and referring now to FIGURE 3, the spool 34 carrying the sheeting 28 is tranferred to a supply stand 36 and the sheeting is led from the spool to a processing machine generally indicated at 38. This machine includes a pair of preheating rollers 40 and 42 which are maintained at an elevated temperature, e.g., within the range of 275° F. to 325° F., and serve to soften the nylon and prepare it for the next step in the processing. The supply stand 36 is provided with brake means (not shown) for restraining rotation of spool 34, merely to tension the sheeting 28 and keep it taut as it feeds into the machine 38.

From preheating rollers 40 and 42, the nylon sheeting 28 is fed through a pair of compression rollers 44 and 46 which also are heated to an elevated temperature, e.g., in the range of 275° to 325° F. The spacing between these rollers is substantially less than the thickness of the sheeting 28, and as a consequence the sheeting 28a emerging from these rollers is compressed and correspondingly elongated in a longitudinal direction. Its width, however, remains effectively unchanged due to the fact that the sheeting is held against lateral expansion or contraction by the grip of the rollers.

From the compression rollers 44 and 46, the nylon sheeting 28 is led around a pair of cooling rollers 48 and 50, which are maintained at approximately room temperature (i.e., 70°–80° F.) by conventional water cooling means (not shown). The nylon is drawn from machine 38 by a pair of rubber-covered rollers 52 and 54, and which are driven by a motor (not shown) having sufficient power to provide a longitudinal tension of about 500 to 1000 pounds on the nylon sheeting 28a. From rollers 52 and 54, the sheeting is led to take-up spool 56 mounted on a rewind stand 58. This spool is driven by a motor-drive unit, diagrammatically indicated at 60, which applies to the nylon just sufficient tension to keep the sheeting suspended above the floor with a small droop.

If the compression rollers 44 and 46 are slightly unbalanced, e.g., not exactly parallel, the nylon sheeting will be elongated more along one side edge than along the other side edge. However, such an unbalanced condition can be immediately detected in the arrangement described above, because one side edge of the sheeting suspended between takeup spool 56 and rollers 52 and 54 will dip lower than the other side edge (as indicated in the drawing). Thus the compression rollers 44 and 46 can quickly be adjusted to provide a proper balanced condition so that the finished sheeting, when run out on a flat surface, will not tend to curve to either side.

In a specific arrangement of the processing machine 38 found to produce excellent results, all of the rollers 40 through 50 were made of smooth surfaced steel 12" in diameter and 20" in length, and the two compression rollers 44 and 46 were driven together at a speed in the range of 1.6 to 6.3 revolutions per minute by a 15-horsepower electric motor. To produce the desired compression-orientation, the nylon sheeting was passed through this machine three times, as follows: In the first pass the sheeting was reduced in thickness from .105" to 0.65"; in the second pass it was reduced to 0.45"; and in the third pass it was reduced to .039". Thus, allowing about .001" for subsequent moisture absorption, the final thickness of the sheeting 28a was .040".

The compression rollers 44 and 46 are similar in construction to calendering rolls and perform, in effect, a hot rolling operation on the nylon sheeting 28, producing a desirably smooth surface and at the same time elongating the nylon sheeting. Sheeting elongated in this manner for example to about 270% (i.e., 2.7 times its original length) will have a tensile strength of between 32,000 and 45,000 p.s.i., depending upon the nylon formula used in the original cast sheeting. Thus, the compression-oriented sheeting may have a tensile strength of between three and four times that of the original cast sheeting.

When nylon is "oriented" by the tension-stretching method, it will be found that there is a definite upper limit to the amount of permanent elongation that can be obtained. This upper limit, which might be termed the "theoretical maximum elongation" of the nylon, varies with changes in the nylon formula and temperature. The nylon can be physically stretched by tension beyond this limit, but when released it will return to the maximum elongation limit. However, when nylon sheeting is cast and then compression-elongated by the method described herein, it is possible to obtain a permanent elongation in excess of the theoretical maximum. More specifically, it has been found that a nylon product with markedly superior properties will be obtained when it is provided with a permanent elongation that is between 5% and 20% greater than the theoretical maximum elongation. For example, when using a nylon formula having a theoretical maximum elongation of 250% at room temperature, a nylon product having a permanent elongation of between 255% and 270% at room temperature will provide specially advantageous characteristics of the type described.

Various degrees of compression and elongation may of course be used for different applications and different nylon fromulas to provide the particular results desired. However, to achieve significant strengthening, the nylon should be elongated substantially, e.g., at least to one-half of the theoretical maximum elongation at room temperature.

Nylon sheeting 28 which has not been oriented according to the present invention by passage through compression rolls 44 and 46 will elongate up to 8% under a 2500 p.s.i. tensile test load. The finished sheeting 28a produced by the machine 38 of FIGURE 3 to have a maximum tensile strength rarely elongates more than an additional 1% to 1.5% under a standard 2500 p.s.i. tensile test load. However, in certain extreme cases, elongations of up to about 4% may be observed. Although this low degree of elongation is a considerable improvement over the elongation observed in untreated nylon sheeting, it may be troublesome if the nylon is employed to form laminated power transmission belts, conveyor belts, or the like which are subjected to heavy duty. The elongation is particularly troublesome since it usually occurs under an applied stress of approximately the tensile load to which drive belts and conveyor belts are subjected in ordinary operation.

The stress-strain characteristics of a compression-oriented sheet are shown in FIGURE 5, in which curve 63 represents the stress-strain curve of a nylon sheet after it has been compression-oriented as outlined above. Curve 63 is from the chart of such a test on an Instron tester of Instron Corporation of Canton, Mass. In performing the test, the tension stress load was imposed to a value of 20,000 pounds per square inch (p.s.i.), and the loading was then reversed and reduced at the same rate (2 inches per minute) to the no-load condition. In FIGURE 5 curve 65 shows the behavior during the reversing of the loading from the maximum back to the zero or no-load. It will be observed that curve 63 has an initial straight-line portion 64 wherein the elongation increases substantially as a function of the increase in stress. However, at slightly less than 10,000 p.s.i. loading, curve 63 has a "plateau" portion 66 where there is considerable non-linearity, i.e., there is a substantial increase in elongation or deformation during very small increase in tension stress. The curve then tends to straighten out along the curve portion 67. When the tension loading is being removed, there is a gradual increase in the rate of recovery, as evident from curve 65. However, curve 65 intersects the axis of ordinates at a considerable distance from the origin or zero point of curve 63, that is, the sheet has retained a substantial deformation or elongation after the removal of the stress. Thereafter, the nylon sheet continued the recovery toward its original length for a period of ten minutes or so after removal of the stress, but it stabilized at a point 69 along the axis of ordinates. Hence, the sheet retained a deformation in the form of permanent elongation.

Figure 6:
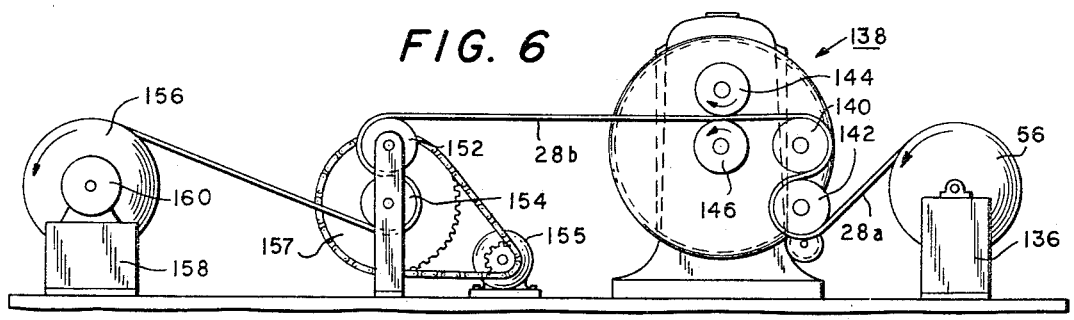

According to the present invention, the compression-oriented nylon sheet described above can be further treated by tension-stretching to produce additional orientation. It has been found that such additional orientation by stretching produces surprisingly improved characteristics in that the finished sheet has a stress-strain characteristic which is more linear than the same sheet prior to the stretch orientation. Furthermore, the stretch orientation inhibits or substantially eliminates the permanent deformation which has been discussed above in connection with curves 63 and 65 of FIGURE 5. Accordingly, there is shown in FIGURE 6 an additional machine which may be considered a modification of FIGURE 3, and which is used to impart the additional stretch orientation to sheet 28a.

The roll 56 of compression-oriented nylon sheeting 28 is shown mounted on a stand 136 and is passed through a stretch-orienting machine 138. Machine 138 has preheating rollers 140 and 142, brake rollers 144 and 146 which are also heated, a pair of tension rollers 152 and 154 and a wind-up unit 160 mounted upon a stand 158 and operative to wind the sheeting into a roll 156. Roller 154 is driven by a motor 155 and a drive wheel 157 so as to place sheeting 28b under tension and subject it to stretch orientation. Roll 56 is restrained from free movement by a brake on stand 136. Sheeting 28a is held under tension at the right by rollers 140, 142, 144 and 136, and it is pulled by rollers 152 and 154. The sheeting is heated to promote stretching throughout the zone from rollers 144 and 146, and rollers 152 and 154. However, rollers 144 and 146 do not exert compressive forces so that the orientation is solely by stretching. The speed of rollers 152 and 154 is such as to increase the length of the sheeting substantially 10% of the length prior to the stretching. It is significant that the stretching involves only a slight amount of necking, e.g., about one-quarter inch in nylon sheet which is 20 inches wide. Hence, in contrast with the substantial necking which would be encountered with the same nylon sheeting which had not been compression-oriented, the sheeting 28a is stretch-oriented with substantially no decrease in film width.

It has been indicated above that the stretching is promoted by heating the sheet. While such heating is not critical, the temperature of the heated rollers is illustratively 320° F.

Although the material which has been stretched by 10% may be passed through the device of FIGURE 5 several times to increase the degree of stretching up to about 25% of the unstretched length, no additional improvement in properties is obtained by such an increase. Accordingly, the material is usually stretched no more than about 10 or 11% of its original length, a process which can be accomplished in a single pass through the device of FIGURE 6.

Referring again to FIGURE 5, curves 70 and 71 show the stress-strain characteristics of sheet 28b when subjected to the identical test by which curves 63 and 65 were produced. It will be observed that there is a surprising decrease in the non-linear characteristic of curve 70 as compared with curve 63. This is particularly important, for example, when the sheet is to be used within a range where the tension stress corresponds to the general stress range of the normal plateau 66 in curve 63. Illustratively, if the sheet 28a were to be used for a belt within the normal range of high tension belts and the tension were to vary during usage between 8,000 p.s.i. and 12,000 p.s.i., the operation would include the range of the plateau 66 of curve 63. At 8,000 p.s.i., the elongation from "no-load" would be of the order of less than two percent, and if there were to be an increase to 12,000 p.s.i., the elongation would increase to the order of seven to eight percent. The conditions might be such that this percentage change in the total length of the belt would materially interfere with the proper operation of the belt. On the other hand, with a sheet 28b having the characteristics of curve 70, and from 8,000 p.s.i. to 12,000 p.s.i. would cause a change in the belt length which would be well within the permissible range for proper operation.

In addition to the improvement with respect to the non-linear characteristics of the sheet, the stretch-orientation also improves the characteristics of returning the sheet to the original length. With the sample from which curves 63 and 65 were obtained, the sheet returned originally to 68 which indicates something above six percent residual elongation, and it then slowly returned to 69 which indicates slightly less than five percent residual elongation. With sheet 28b, the immediate return was to 75 which indicates something of the order of two percent residual elongation, and within a period of ten minutes thereafter, it returned to 76 which indicates slightly more than one percent residual elongation. It will be appreciated that this characteristic of substantial returning to original length is an important characteristic of sheet 28b.

It has been observed that finished nylon sheeting produced as discussed above normally will have a slight transverse "crowning," i.e., it will not lie perfectly flat when run out on flat surface. This crowning apparently is due to a distortion of the nylon immediately adjacent its marginal edges, resulting from the fact that the edges of the sheet are squeezed out laterally a small amount as the sheet passes through the compression rollers 44 and 46. This crowning effect can, however, be overcome by trimming the marginal edges of the sheet back a short distance as indicated at 62 in FIGURE 4. For example, with a sheet 12" in width crowning may be avoided by trimming about 1" to 1½" off of each side.

The benefits of the present invention can best be attained by working the nylon during the compression orientation at an elevated temperature, e.g., within the range of 275° F. to 325° F. In commercial operations utilizing the present invention, the finished product is moistened with water so as to induce moisture equilibrium, and this causes a slight increase in the thickness of the sheeting.

In one illustrative embodiment of a commercial operation incorporating the present invention, the sheeting 28 was 19½ inches wide and .071 inch thick and its tensile strength was 10,650 p.s.i. After compression-orientation the sheeting 28a was 18¾ inches wide and 0.26 inch thick, and its tensile strength was 40,860 p.s.i. The orientation increased the length so that 100 inches of sheeting 28 became 285 inches of sheeting 28a, an increase to 285% of the original length. Measured in terms of reduction in thickness, the compression-orientation was 273%, but the decrease in width from 19½ inches to 18¾ inches represented a slight necking down. That accounts for the fact that the length was increased to 285% of the original length, whereas the reduction in thickness would indicate that the increase in length should be to 273%. It has been found that extreme brittleness is produced if the compression-orientation is materially above the magnitude of this illustrative embodiment. However, the additional tension orientation does not increase brittleness and that additional step permits a further increase in the orientation as discussed above.

Sheeting produced in accordance with the present invention has proven very satisfactory in many industrial applications. The sheeting is extremely stable in physical characteristics and is not easily ruptured or damaged by impact. When incorporated as one ply in a driving belt, the characteristic of being somewhat elastic without objectionable permanent stretch insures stable operating conditions, even immediately after installation. Also, the pulley and belt sizes are minimum.

As many possible embodiments may be made of this invention, all without departing from the scope thereof, it is understood that this disclosure is to be considered as illustrative, and not in a limiting sense.

I claim:

1. The method of increasing the tensile strength and stress-strain linearity of a sheet of polyamide plastic, comprising heating the plastic sheet to an elevated temperature by passing it between a pair of preheating rollers having a temperature of the order of 275° F. to 325° F., passing the sheet between a pair of compression rollers, the spacing between said compression rollers being substantially less than the thickness of said sheet whereby said sheet is permanently elongated to a length of the order of 240% to 285% of its length prior to passing between said compression rollers, and stretching said sheet to increase its length by an amount on the order of 10 percent or more.

2. In the method of modifying the physical properties of solid nylon by compression orientation thereof by passing the solid nylon through rollers to increase its length to a value of not greater than the order of 285 percent of its original length, the improvement which comprises subjecting the nylon to stretch orientation to increase its length by at least about 10 percent.

3. The method of increasing the tensile strength of a sheet of polyamide plastic which comprises passing the sheet between a pair of compression rollers, the spacing between said rollers being substantially less than the thickness of said sheet, to elongate said sheet to 240 percent to 280 percent of its length prior to passing through said rollers to produce compression orientation, and subjecting the sheet to stretching to elongate said sheet by at least about 10 percent of its length prior to stretching to produce stretch orientation.

4. The method as described in claim 3 wherein the sheet is passed through the compression rollers at a temperature of the order of 275° F. to 325° F.

5. Compression- and stretch-oriented solid nylon sheeting prepared according to the process of claim 10, said sheeting having a tensile strength between 32,000 p.s.i. and 45,000 p.s.i. and having a more linear stress-strain curve than does nylon which has only been compression oriented.

References Cited

UNITED STATES PATENTS

| 2,141,169 | 12/1938 | Catlin. | |
| 2,244,208 | 6/1941 | Miles | 264—175 |
| 2,952,878 | 9/1960 | Swerlick et al. | |

FOREIGN PATENTS 584,684  10/1959  Canada.

ROBERT E. WHITE, *Primary Examiner.*

S. A. HELLER, G. AUVILLE, *Assistant Examiners.*

UNITED STATES PATENT OFFICE
CERTIFICATE OF CORRECTION

Patent No. 3,340,235                                      September 5, 1967

John E. Holt

It is hereby certified that error appears in the above numbered patent requiring correction and that the said Letters Patent should read as corrected below.

Column 6, line 56, for "0.26" read -- .026 --; column 8, line 15, for the claim reference numeral "10" read -- 2 --.

Signed and sealed this 22nd day of October 1968.

(SEAL)
Attest:

Edward M. Fletcher, Jr.                           EDWARD J. BRENNER
Attesting Officer                                    Commissioner of Patents